(12) United States Patent
Hsu (10) Patent No.: US 9,805,236 B2
(45) Date of Patent: Oct. 31, 2017

(54) CODING AND DECODING METHOD USING PATTERNS AND SYSTEM THEREOF

(71) Applicant: PIXART IMAGING INC., Hsin-Chu (TW)

(72) Inventor: En-Feng Hsu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/075,831

(22) Filed: Mar. 21, 2016

(65) Prior Publication Data

US 2017/0061178 A1   Mar. 2, 2017

(30) Foreign Application Priority Data

Aug. 31, 2015  (TW) .............................. 104128606 A (51) Int. Cl.
    G02B 26/08   (2006.01)
    G06K 7/10    (2006.01)
    G06K 19/06   (2006.01)

(52) U.S. Cl.
    CPC .... G06K 7/10811 (2013.01); G06K 19/06037 (2013.01)

(58) Field of Classification Search
    CPC ......... G06K 7/10811; G06K 19/06037; G06K 19/06009; G06K 19/06046; G06K 7/1413; G06K 7/1417; G06K 7/1426; G06K 7/1486; G06K 19/06028; G06K 19/06018; G06K 19/06075
    See application file for complete search history.

(56) References Cited

U.S. PATENT DOCUMENTS

| 4,843,222 A | 6/1989 | Hochgraf |
| 2005/0167498 A1* | 8/2005 | Ito ..................... G06K 7/10851 235/454 |
| 2005/0173544 A1 | 8/2005 | Yoshida |
| 2008/0029603 A1 | 2/2008 | Harris |

(Continued)

FOREIGN PATENT DOCUMENTS

| CN | 1114441 A | 1/1996 |
| CN | 101615259 A | 12/2009 |

(Continued)

*Primary Examiner* — Laura Gudorf
(74) *Attorney, Agent, or Firm* — Li & Cai Intellectual Property (USA) Office (57) ABSTRACT

Disclosed are coding and decoding methods using patterns and a system thereof. The object-images are obtained via detecting a pattern comprising objects. The distances between the object-images are obtained and a code is found based on the obtained distances between the object images. The distances between the object-images are defined as distances between centers of the object-images. As there are at least three objects in a pattern, a code is obtained based on a ratio of distances between object-images, which equals to a ratio of distances between objects. As there are at least four objects in a pattern, it is first determined whether a first ratio of object-images equals to a predetermined ratio of object-images. If no, a second ratio of object-images is obtained via a correcting factor and the first ratio of object-image, and finally a code is obtained based on the second ratio of object-images.

6 Claims, 7 Drawing Sheets

(56) References Cited

U.S. PATENT DOCUMENTS

| | | | |
|---|---|---|---|
| 2009/0014520 A1* | 1/2009 | Kofman | G06K 19/06037 235/439 |
| 2009/0212113 A1 | 8/2009 | Chiu et al. | |
| 2015/0262051 A1* | 9/2015 | Yoshida | G06K 19/06037 235/454 |
| 2016/0132707 A1 | 5/2016 | Lindbo et al. | |

FOREIGN PATENT DOCUMENTS

| | | |
|---|---|---|
| CN | 202976114 U | 6/2013 |
| TW | 201201107 A1 | 1/2012 |
| TW | 201441945 | 11/2014 |

\* cited by examiner

CODING AND DECODING METHOD USING PATTERNS AND SYSTEM THEREOF

BACKGROUND OF THE INVENTION

1. Field of the Invention

The instant disclosure relates to a coding and decoding method and a system thereof; in particular, to a coding and decoding method using patterns and a system thereof.

2. Description of Related Art

Currently, the technology involved in coding and decoding has been widely used. The 1-D bar code, the two-D bar code and even the micro-code have become common. However, the technology involved in coding and decoding the 1-D bar code, the 2-D bar code and even the micro-code is always limited by the focal length of the sensor, which further limits the decoding accuracy when decoding within a short distance.

On the other hand, the currently used technology of decoding the 1-D bar code, the 2-D bar code and even the micro-code is also often limited by the resolution of the sensor. In other words, only when the resolution of the sensor is larger than the resolution of the bar code, can the bar code be recognized. Moreover, during the code recognition, if the sensor is tilted, the decoding accuracy would be decreased because of the sensing error.

SUMMARY OF THE INVENTION

The instant disclosure provides a coding method using patterns. The coding method using pattern comprises: providing a pattern comprising a plurality of objects; and setting at least one distance between the objects in the pattern to form a code.

The instant disclosure further provides a decoding method using patterns. The decoding method using patterns comprises: sensing a pattern comprising a plurality of objects and obtaining a plurality of object-images corresponding to the objects; obtaining at least one distance between the object-images; and obtaining a code according to the distance between the object-images. The distance between the object-images is a distance between centers of the object-images.

In one of embodiments provided by the instant disclosure, the pattern comprises two objects, a distance between the objects is obtained according to the distance between the object-images, and the code is obtained according to the distance between the objects.

In one of embodiments provided by the instant disclosure, the pattern comprises at least three objects, the code is obtained according to a ratio of the distances between the objects, and a ratio of the distances between the object-images equals to the objects In one of embodiments provided by the instant disclosure, the pattern comprises at least four patterns, and the step of obtaining a code according to the distance between the object-images comprises: obtaining a first ratio of the distances between the object-images; comparing the first ratio of the distances between the object-images and a predetermined distance ratio; if the first ratio of the distances between the object-images equals to the predetermined distance ratio, obtaining the code according to the first ratio of the distances between the object-images; and if the first ratio of the distances between the object-images does not equal to the predetermined distance ratio, calculating a correcting factor, calculating a second ratio of the distances between the object-images according to the correcting factor and the first ratio of the distances between the object-images, and obtaining the code according to the second ratio of the distances between the object-images. The second ratio of the distances between the object-images equals to a ratio of the distances between the objects.

The instant disclosure further provides a decoding system using patterns, and the system comprises one or more than one circuits. The decoding system using patterns is configured to: sense a pattern comprising a plurality of objects and obtain a plurality of object-images corresponding to the objects; obtain at least one distance between the object-images; and obtain a code according to the distance between the object-images. The distance between the object-images is a distance between centers of the object-images.

To sum up, the coding and decoding method using patterns and the system thereof provided by the instant disclosure sensing the patterns and obtain the distances between the object-images or the ratio of the distances between the object-images, and obtain a code according to the obtained distances between the object-images or the ratio of the distances between the object-images.

Comparing with the current decoding method using patterns, in the coding and decoding method using patterns and the system thereof provided by the instant disclosure, the distances between the objects are set for coding and the pattern is sensed to obtain the distances between object-images for decoding. Thus, when decoding, the limitation resulting from the focal lengths and the resolution of the sensing elements can be less, which makes decoding able to be realized by sensing the pattern within a short distance. In addition, in the coding and decoding method using patterns and the system thereof provided by the instant disclosure, the ratio of object-images is also set for coding, and thus it allows changes of the height position of the sensor and also can compensate for the errors resulting from the tilt of the sensor.

For further understanding of the instant disclosure, reference is made to the following detailed description illustrating the embodiments and embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

[One Embodiment of the Coding Method Using Patterns]

Figure 1A:
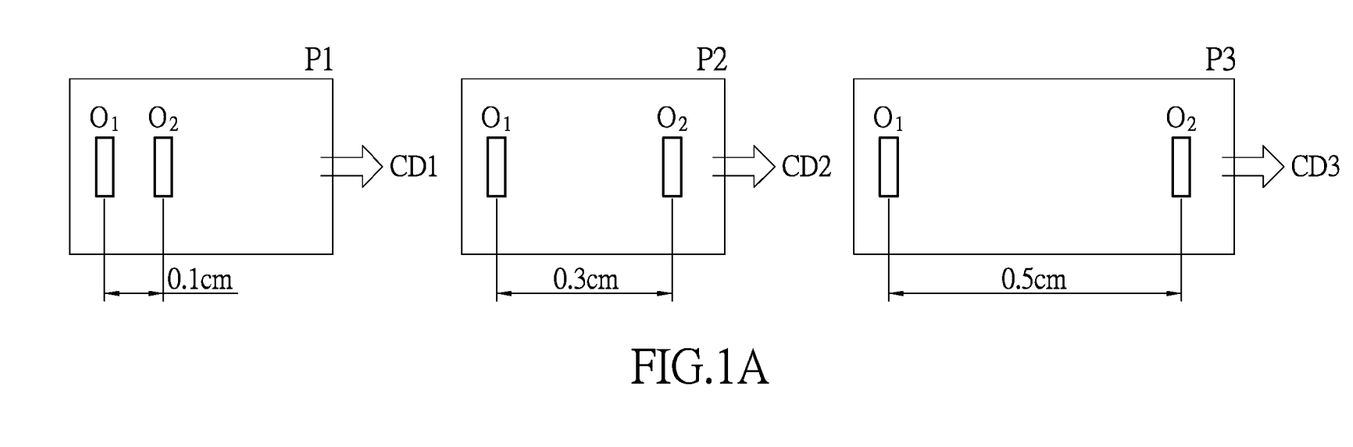
FIGS. 1A~1C show schematic diagrams of a coding method using patterns of one embodiment of the instant disclosure.
Figure 1B:
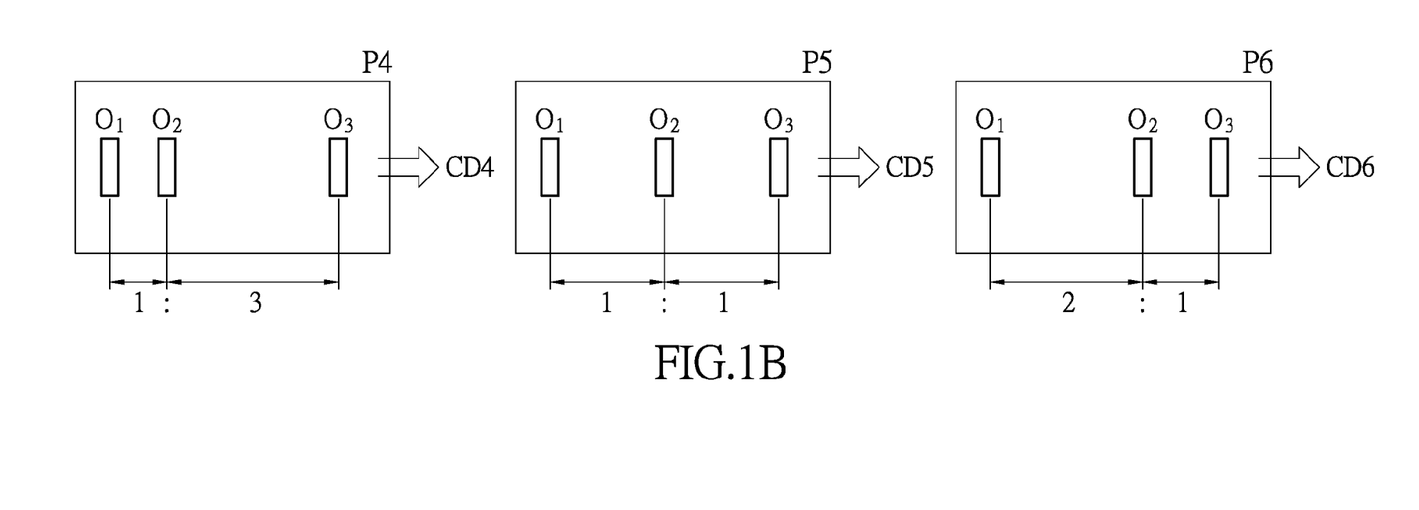
Figure 1C:
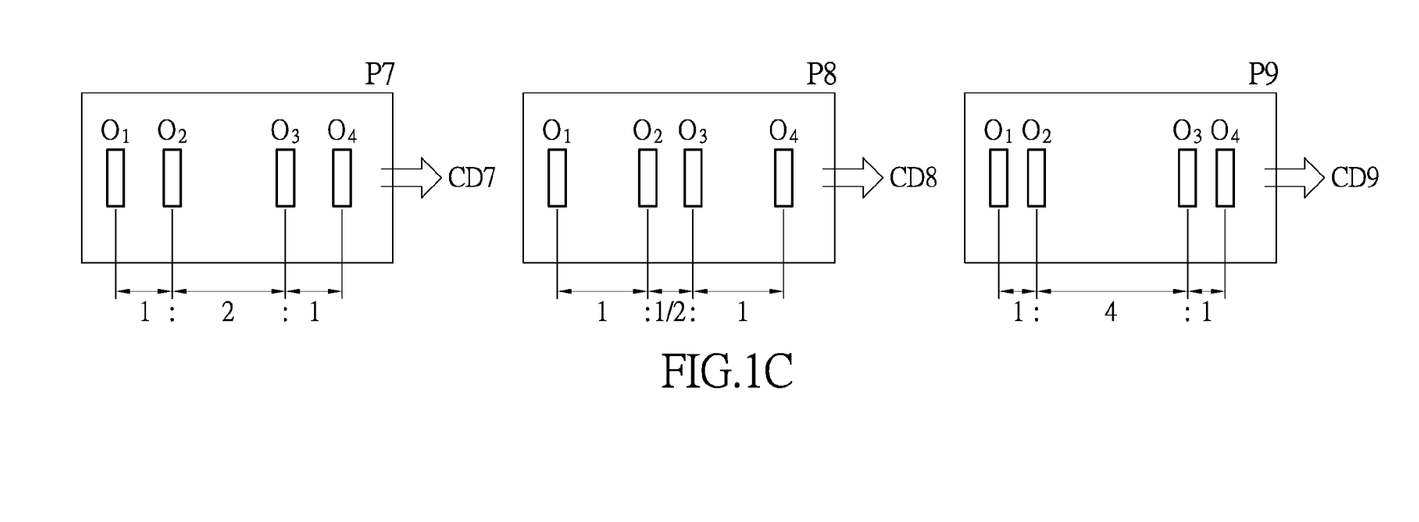

In this embodiment, the coding method using patterns comprises the steps: providing a pattern comprising a plurality of objects; and setting at least one distance between the objects in the pattern to form a code. Please refer to FIGS. 1A~1C. FIGS. 1A~1C show schematic diagrams of a coding method using patterns of one embodiment of the instant disclosure. As shown in FIG. 1A, a plurality of patterns P1~P3 respectively comprise a plurality of objects $O_1$ and $O_2$. In the pattern P1, the distance between the objects $O_1$ and $O_2$ is set to be 0.1 cm to form a code CD1. In the pattern P2, the distance between the objects $O_1$ and $O_2$ is set to be 0.3 cm to form a code CD2. In the pattern P3, the distance between the objects $O_1$ and $O_2$ is set to be 0.5 cm to form a code CD3.

In another embodiment, the coding method using patterns comprises the steps: providing a pattern comprising at least three objects; and setting the distances between the objects in the pattern to form a code. The code is related to the ratio of the distances between the objects. As shown in FIG. 1B, the plurality of patterns P4~P6 respectively comprise three objects $O_1$, $O_2$ and $O_3$. In the pattern P4, a ratio of the distance between the objects $O_1$ and $O_2$ and the distance between the objects $O_2$ and $O_3$ is set as 1:3 to form a code CD4. In the pattern P5, a ratio of the distance between the objects $O_1$ and $O_2$ and the distance between the objects $O_2$ and $O_3$ is set as 1:1 to form a code CD5. In the pattern P6, a ratio of the distance between the objects $O_1$ and $O_2$ and the distance between the objects $O_2$ and $O_3$ is set as 2:1 to form a code CD6.

In another embodiment, the coding method using patterns comprises the steps: providing a pattern comprising at least four objects; and setting the distances between the objects in the pattern to form a code. The code is related to the ratio of the distances between the objects. As shown in FIG. 1C, a plurality of patterns P7~P9 respectively comprise at least four objects $O_1$, $O_2$, $O_3$ and $O_4$. In the pattern P7, a ratio of the distance between the objects $O_1$ and $O_2$, the distance between the objects $O_2$ and $O_3$ and the distance between the objects $O_3$ and $O_4$ is set as 1:2:1 to form a code CD7. In the pattern P8, a ratio of the distance between the objects $O_1$ and $O_2$, the distance between the objects $O_2$ and $O_3$ and the distance between the objects $O_3$ and $O_4$ is set as 1:0.5:1 to form a code CD8. In the pattern P9, a ratio of the distance between the objects $O_1$ and $O_2$, the distance between the objects $O_2$ and $O_3$ and the distance between the objects $O_3$ and $O_4$ is set as 1:4:1 to form a code CD9. It is worth mentioning that, in this embodiment, a ratio of at least two of the distances between the objects is fixed. For example, in the patterns P7~P9, the ratio of the distance between the objects $O_1$ and $O_2$ and the distance between the objects $O_3$ and $O_4$ is fixed to 1:1. Thus, different codes can be formed by setting different distances between the objects $O_2$ and $O_3$.

It should be noted that, to describe the embodiments of the instant disclosure easily, the patterns P7~P9 comprising four objects are taken for example; however, it is not limited herein. That is, the patterns P7~P9 can comprise more than four objects.

In the above mentioned embodiments, the objects in the patterns P1~P9 are arranged along a line or on a plane; however, it is not limited herein. In other words, the patterns P1~P9 can be bar codes or quick response codes (QR Code).

[One Embodiment of the Decoding Method Using Patterns]

In this embodiment, the coding method using patterns comprises the steps: sensing a pattern comprising a plurality of objects and obtaining a plurality of object-images corresponding to the objects; obtaining at least one distance between object-images; and obtaining a code according to the distance between object-images. The distance between the object-images is a distance between centers of the object-images. In addition, in this embodiment, the objects in the patterns are arranged along a line or on a plane; however, it is not limited herein. In other words, the patterns P1~P9 can be bar codes or quick response codes (QR Code).

Figure 2:
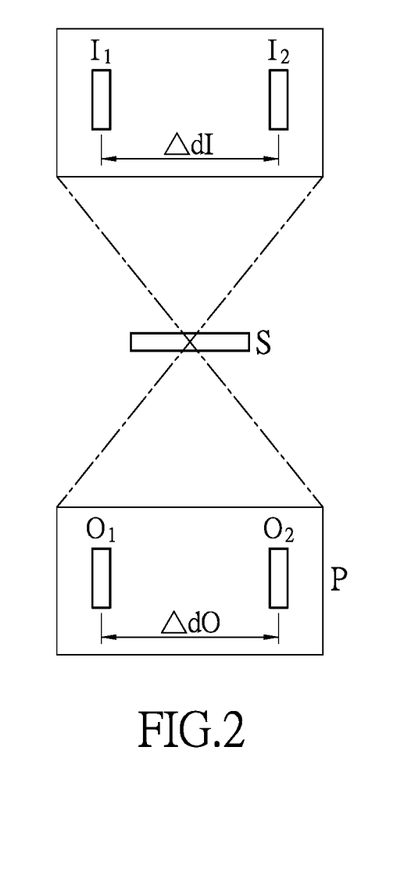
FIG. 2 shows a schematic diagram of a decoding method using patterns of one embodiment of the instant disclosure.

Please refer to FIG. 2. FIG. 2 shows a schematic diagram of a decoding method using patterns of one embodiment of the instant disclosure. In this embodiment, the sensed pattern P comprises two objects $O_1$ and $O_2$. Via imaging, the distance $\Delta dI$ between the two object-images $I_1$ and $I_2$ can be obtained according to the distance $\Delta dO$ between the objects $O_1$ and $O_2$. The distance $\Delta dO$ between the objects and the corresponding code can be obtained according to the distance between the object-images $\Delta dI$ and the distance between the sensor S and the pattern P For example, as shown in FIG. 2, when decoding, the sensor S senses the pattern P comprising two objects $O_1$ and $O_2$ and obtains two object-images $I_1$ and $I_2$ and the distance $\Delta dI$ between object-images $I_1$ and $I_2$, wherein the distance between the objects $O_1$ and $O_2$ is $\Delta dO$. As mentioned above, when coding, the distance $\Delta dO$ between the objects is set to correspond to a specific code. Thus, the sensor can obtain the distance $\Delta dO$ between the objects and the corresponding code according to the distance $\Delta dI$ between object-images $I_1$ and $I_2$.

More precisely, the decoding method using patterns in this embodiment senses the patterns and obtains the distance between the object-images for decoding. In other words, even when sensing patterns within a short distance and thus the outlines of the two object-images obtained by the sensor might be blurred, as long as the sensor can tell the centers of the two object-images, the distance between the two object-images can be obtained. After that, one specific code can be obtained via decoding based on the distance between the two object-images. Thereby, in the case of sensing patterns within a short distance, the limitation resulting from the focal length and resolution of the sensor can be much less. Also, the resolution power of the sensor can be raised eight times or more. Moreover, preferably, the distance between the sensor and the pattern P comprising two objects $O_1$ and $O_2$ is fixed.

[Another Embodiment of the Decoding Method Using Patterns]

Figure 3:
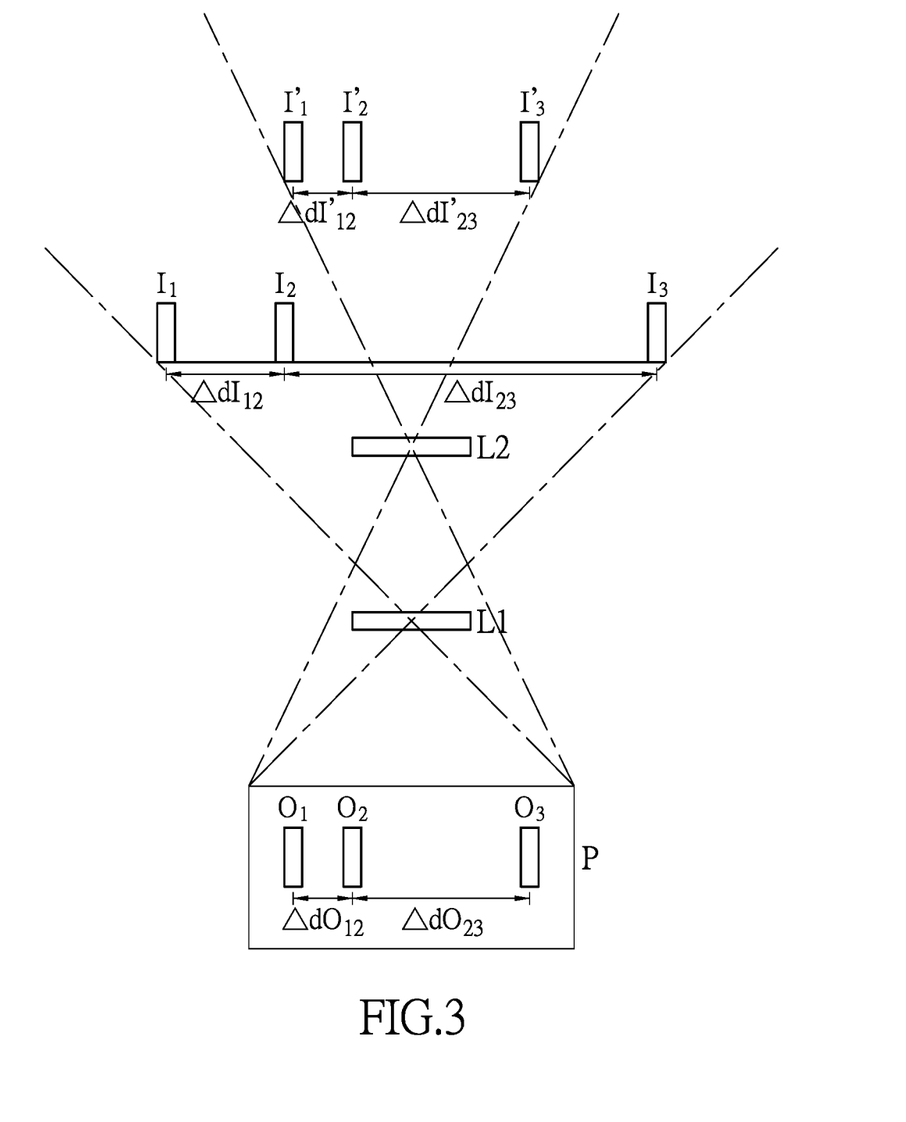
FIG. 3 shows a schematic diagram of a decoding method using patterns of another embodiment of the instant disclosure.

Please refer to FIG. 3. FIG. 3 shows a schematic diagram of a decoding method using patterns of another embodiment of the instant disclosure. The difference between the embodiments shown in FIG. 2 and FIG. 3 is that, in the embodiment shown in FIG. 3, the sensed pattern P comprises three objects $O_1$, $O_2$ and $O_3$, and a code can be obtained according to the ratio $\Delta dO_{12}:\Delta dO_{23}$ of the distances between the objects, and the ratio $\Delta dO_{12}:\Delta dO_{23}$ of the distances between the objects $O_1$, $O_2$ and $O_3$ equals to the ratio $\Delta dI12:\Delta dI23$ of the distances between the object-images $I_1$, $I_2$ and $I_3$.

For example, as shown in FIG. 3, when decoding, the sensor S senses the pattern P comprising three objects $O_1$, $O_2$ and $O_3$ at the height position L1, obtains three object-images $I_1$, $I_2$ and $I_3$, and obtains a ratio $\Delta dI_{12}:\Delta dI_{23}$ of the distance $\Delta dI_{12}$ between the object-images $I_1$ and $I_2$ and the distance $\Delta dI_{23}$ between the object-images $I_2$ and $I_3$. After that, the sensor S obtains a ratio $\Delta dO_{12}:\Delta dO_{23}$ of the distances between the objects $O_1$, $O_2$ and $O_3$ and further obtains a specific code, according to the obtained ratio $\Delta dI12:\Delta dI23$ of the distances between the object-images $I_1$, $I_2$ and $I_3$.

Please again refer to FIG. 3. After being displaced to the height position L2, the sensor S can still sense the pattern P comprising three objects $O_1$, $O_2$ and $O_3$, obtains three object-images $I'_1$, $I'_2$ and $I'_3$, and obtains a ratio $\Delta dI'_{12}:\Delta dI'_{23}$ of the distance $\Delta dI'_{12}$ between the object-images $I'_1$ and $I'_2$ and the distance $\Delta dI'_{23}$ between the object-images $I'_2$ and $I'_3$. It should be noted that, at the different height positions L1 and L2, according to the optical imaging principle, the distance $\Delta dI12$ between the object-images I1 and I2 obtained by the sensor S would not equal to the distance $\Delta dI'12$ between the object-images I'1 and I'2 obtained by the sensor S, and also the distance $\Delta dI23$ between the object-images I2 and I3 obtained by the sensor S would not equal to the distance $\Delta dI'23$ between the object-images I'2 and I'3 obtained by the sensor S. However, the ratio $\Delta dI12:\Delta dI23$ of the distances between the object-images $I_1$, $I_2$ and $I_3$ would always equal to the ratio $\Delta dI'12:\Delta dI'23$ of the distances between the object-images $I_1$, $I_2$ and $I_3$. Thus, even if the sensor S is positioned at different heights L1 and L2, it can obtain the same ratio of the distances between the object-images, and correspondingly obtain the same ratio of distances between the objects (that is, $\Delta dI12:\Delta dI23=\Delta dI'12:\Delta dI'23$, and $\Delta dI12:\Delta dI23=\Delta dI'12:\Delta dI'23=\Delta dO12:\Delta dO23$), and further obtain a corresponding code.

In this embodiment, even if the sensor S is positioned at different heights and the obtained distances between the object-images are different, the same ratio of the distances between the object-images and the corresponding ratio of distances between the objects can still be obtained according to the optic imaging principle. Therefore, either way, the obtained codes would be the same. In other words, the decoding method using patterns provided in this embodiment allows changes of the height positions of the sensor, which provides the flexibility during the sensing process.

[Another Embodiment of the Decoding Method Using Patterns]

Figure 4:
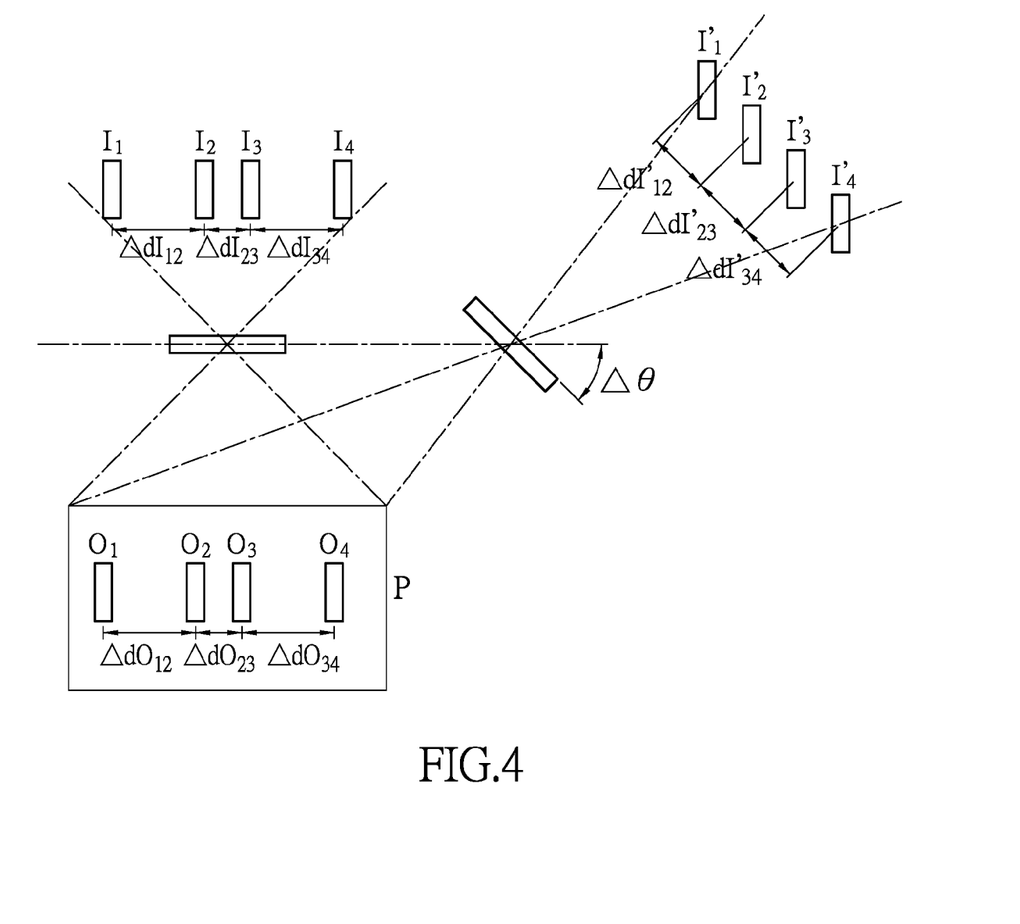
FIG. 4 shows a schematic diagram of a decoding method using patterns of another embodiment of the instant disclosure.

Please refer to FIG. 4. FIG. 4 shows a schematic diagram of a decoding method using patterns of another embodiment of the instant disclosure. The difference between the embodiments shown in FIG. 2 and FIG. 4, in the embodiment shown in FIG. 4, the sensed pattern P comprises four objects $O_1$, $O_2$, $O_3$ and $O_4$, and a code can be obtained according to the ratio $\Delta dO_{12}:\Delta dO_{23}:\Delta dO_{34}$ the distances between the objects, and the ratio $\Delta dO_{12}:\Delta dO_{23}:\Delta dO_{34}$ of the distances between the objects $O_1$, $O_2$, $O_3$ and $O_4$ equals to the ratio $\Delta dI_{12}:\Delta dI_{23}:\Delta dI_{34}$ of the distances between the object-images $I_1$, $I_2$, $I_3$ and $I_4$. It should be noted that, in order to easily describe this embodiment, the pattern P comprising four objects $O_1$, $O_2$, $O_3$ and $O_4$ is taken as an example; however, it is not limited herein. That is, the pattern P can comprise more than four objects.

The decoding mechanisms of the embodiments shown in FIG. 3 and FIG. 4 are similar. The only difference is that, in the embodiment shown in FIG. 4, it is necessary to determine whether to calibrate the first ratio $\Delta dI_{12}:\Delta dI_{23}:\Delta dI_{34}$ (or $\Delta dI'_{12}:\Delta dI'_{23}:\Delta dI'_{34}$) of the distances between the object-images $I_1$, $I_2$, $I_3$ and $I_4$ (or $I'_1$, $I'_2$, $I'_3$ and $I'_4$) via a correcting factor. If it is, a second ratio of the distances between the object-images would be calculated according to the correcting factor. After that, a ratio $\Delta dO_{12}:\Delta dO_{23}:\Delta dO_{34}$ of distances between the objects can be correspondingly obtained, so as to obtain a specific code, wherein the second ratio of the distances between the object-images equals to the ratio $\Delta dO_{12}:\Delta dO_{23}:\Delta dO_{34}$ of distances between the objects.

More precisely, FIG. 4 shows two situations where there is a tilt of sensor or there is not. As shown in FIG. 4, when decoding, the sensor S first obtains a first ratio $\Delta dI_{12}:\Delta dI_{23}:\Delta dI_{34}$ of the distances between the object-images. After that, in order to determine whether there is a tilt of the sensor which would result in a sensing error, the sensor S compares the first ratio $\Delta dI_{12}:\Delta dI_{23}:\Delta dI_{34}$ of the distances between the object-images and a predetermined distance ratio. If the first ratio $\Delta dI_{12}:\Delta dI_{23}:\Delta dI_{34}$ of the distances between the object-images equals to the predetermined distance ratio, there is no tilt of the sensor S. Thus, the sensor S can directly decode the pattern P and obtain a corresponding code, according to the ratio of the distances between the objects, wherein the ratio $\Delta dO_{12}:\Delta dO_{23}:\Delta dO_{34}$ of the distances between the objects is corresponding to the first ratio of the distances between the object-images.

On the other hand, if the first ratio $\Delta dI'_{12}:\Delta dI'_{23}:\Delta dI'_{34}$ of the distances between the object-images does not equal to the predetermined distance ratio, the sensor S is tilted by an inclined angle $\theta$, which would result in a sensing error that needs to be compensated via a correcting factor. In this case, the sensor S calculates a correcting factor, and calculates a second ratio of the distances between the object-images via the correcting factor and the first ratio $\Delta dI'_{12}:\Delta dI'_{23}:\Delta dI'_{34}$ of the distances between the object-images. After that, a corresponding code can be obtained according to the ratio $\Delta dO_{12}:\Delta dO_{23}:\Delta dO_{34}$ of the distances between the objects, wherein the ratio of the distances between the objects is corresponding to the second ratio of the distances between the object-images.

It is worth mentioning that, in this embodiment, a ratio of at least two of the distances between the objects is fixed. For example, the ratio of the distance between the objects $O_1$ and $O_2$ and the distance between the objects $O_3$ and $O_4$ is fixed as 1:1, and the distance between the objects $O_2$ and $O_3$ can be set as different values, which is for the convenience of determining whether there is a tilt of sensor S. However, it is not limited herein. In other words, as long as a ratio of any two distances between the objects is fixed, it would help to check whether there is a tilt of sensor S. Moreover, in this embodiment, there is a built-in database, wherein the built-in database stores different ratios $\Delta dI'_{12}:\Delta dI'_{34}$ of the distances between the object-images with different inclined angles $\theta$ by which the sensor S is tilted, and stores corresponding correcting factors. In one case that the ratio $\Delta dO_{12}:\Delta dO_{34}$ of the distances between the objects is fixed as 1:1, if the ratio $\Delta dI'_{12}:\Delta dI'_{34}$ of the distances between the object-images is not 1:1, it is determined that there is a need to compensate the error resulted from the tilt of the sensor S via the correcting factor. After that, the sensor S searches for a correcting factor corresponding to the ratio $\Delta dI'_{12}:\Delta dI'_{34}$ of the distances between the object-images from the built-in database, and the sensor S calculates the calibrated distance between the object-images of the objects $O_2$ and $O_3$ via the correcting factor. As shown in FIG. 4, in the case that the height position of the sensor S is maintained and the sensed patterns are the same, the calibrated distance between the object-images of the objects $O_2$ and $O_3$ would equal to the distance $\Delta dI23$ between the object-images $I_2$ and $I_3$. In other words, in this case ($\Delta dO_{12}$:$\Delta dO_{34}$ is fixed as 1:1), the second ratio of the distances between the object-images which is calibrated via the correcting factor can be obtained as 1:$\Delta dI_{23}$:1. The second ratio of the distances between the object-images which is calibrated as 1:$\Delta dI_{23}$:1 equals to the ratio $\Delta dO_{12}$:$\Delta dO_{23}$:$\Delta dO_{34}$ of the distances between the objects, so the sensor S can obtain the ratio $\Delta dO_{12}$:$\Delta dO_{23}$:$\Delta dO_{34}$ of the distances between the objects and further obtain a corresponding code.

Thus, in this embodiment, a ratio of any two distances between the objects is fixed, so even if the sensor S is tilted by an inclined angle θ, a corresponding correcting factor can still be found in the built-in database via a comparison. After that, the calibrated distance between object-images can be calculated via the found correcting factor, the ratio of the distances between the objects in the sensed pattern can be further obtained, and thus a corresponding code can be found. That is, the decoding method using patterns provided by this embodiment of the instant disclosure can compensate for the error resulting from the tilt of the sensor, which provides flexibility during the sensing process.

[One Embodiment of the Decoding System Using Patterns]

Figure 5:
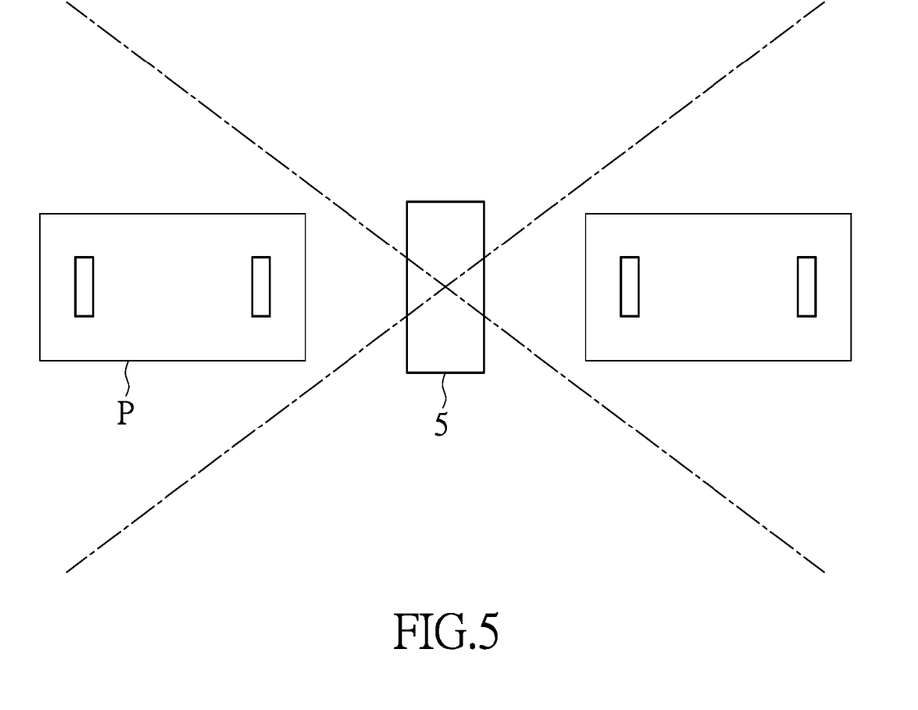
FIG. 5 shows a schematic diagram of a decoding system using patterns of one embodiment of the instant disclosure.

Please refer to FIG. 5. FIG. 5 shows a schematic diagram of a decoding system using patterns of one embodiment of the instant disclosure. The decoding system 5 using patterns provided in this embodiment comprises one or more than one circuits, configured to: sense a pattern P comprising a plurality of objects and obtain a plurality of object-images corresponding to the objects; obtain at least one distance between the object-images; and obtain a code according to the distance between the object-images. The distance between the object-images is a distance between the centers of the object-images. For example, the decoding system 5 comprises a charge-coupled device (CCD), but it is not limited herein.

It should be noted that, all of the decoding methods using patterns described in the above mentioned embodiments can be implemented in the decoding system 5 using patterns shown in FIG. 5. However, relevant details of the steps of the decoding methods using patterns are described in the embodiments of FIGS. 2~4, and thus it is not repeated here.

To sum up, the coding and decoding method using patterns and the system thereof provided by the instant disclosure senses the patterns and obtains the distances between the object-images or the ratio of the distances between the object-images, and obtains a code according to the obtained distances between the object-images or the ratio of the distances between the object-images.

Compared with the current decoding method using patterns, in the coding and decoding method using patterns and the system thereof provided by the instant disclosure, the distances between the objects are set for coding and the pattern is sensed to obtain the distances between object-images for decoding. Thus, when decoding, the limitation resulting from the focal lengths and the resolution of the sensing elements can be less, which makes decoding by sensing the pattern within a short distance able to be realized. In addition, in the coding and decoding method using patterns and the system thereof provided by the instant disclosure, the ratio of object-images is also set for coding, and thus it allows changes of the height position of the sensor and also can compensate for the errors resulting from the tilt of the sensor.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A decoding method using barcode patterns, adapted to a sensor, comprising:
   through the sensor, sensing a barcode pattern comprising a plurality of objects and obtaining a plurality of object-images corresponding to the objects, wherein the barcode pattern comprises at least four objects and a ratio of at least two distances between the objects is fixed;
   through the sensor, obtaining each distance between adjacent object-images;
   through the sensor, obtaining a first ratio of the distances between the object-images;
   through the sensor, comparing the first ratio of the distances between the object-images and a predetermined distance ratio;
   through the sensor, obtaining barcode information according to the first ratio of the distances between the object-images, if the first ratio of the distances between the object-images equals to the predetermined distance ratio;
   wherein the distance between the object-images is a distance between centers of the object-images.

2. The decoding method using barcode patterns according to claim 1, wherein the step of comparing the first ratio of the distances between the object-images and the predetermined distance ratio comprises:
   through the sensor, calculating a correcting factor, calculating a second ratio of the distances between the object-images according to the correcting factor and the first ratio of the distances between the object-images, and obtaining the barcode information according to the second ratio of the distances between the object-images, if the first ratio of the distances between the object-images does not equal to the predetermined distance ratio;
   wherein the second ratio of the distances between the object-images equals to a ratio of the distances between the objects.

3. The decoding method using barcode patterns according to claim 1, wherein the objects in the barcode pattern are arranged along a line or on a plane.

4. A decoding system using barcode patterns, comprising at least a sensor, wherein the sensor comprises one or more than one circuits and is configured to:
   sense a barcode pattern comprising a plurality of objects and obtain a plurality of object-images corresponding to the objects, wherein the barcode pattern comprises at least four objects and a ratio of at least two distances between the objects is fixed;
   obtain each distance between adjacent object-images;
   obtain a first ratio of the distances between the object-images;
   compare the first ratio of the distances between the object-images and a predetermined distance ratio;
   obtain barcode information according to the first ratio of the distances between the object-images, if the first ratio of the distances between the object-images equals to the predetermined distance ratio;

wherein the distance between the object-images is a distance between centers of the object-images.

5. The decoding system using barcode patterns according to claim 4, wherein when the sensor obtains the barcode information according to the first ratio of the distances between the object-images as the first ratio of the distances between the object-images equals to the predetermined distance ratio, the sensor is configured further to:

calculate a correcting factor, calculate a second ratio of the distances between the object-images according to the correcting factor and the first ratio of the distances between the object-images, and obtain the barcode information according to the second ratio of the distances between the object-images, if the first ratio of the distances between the object-images does not equal to the predetermined distance ratio;

wherein the second ratio of the distances between the object-images equals to a ratio of the distances between the objects.

6. The decoding system using barcode patterns according to claim 4, wherein the objects in the barcode pattern are arranged along a line or on a plane.

\* \* \* \* \*